(12) United States Patent
Wu et al.

(10) Patent No.: US 11,496,466 B2
(45) Date of Patent: Nov. 8, 2022

(54) USING AN ENROLLED BIOMETRIC DATASET TO DETECT ADVERSARIAL EXAMPLES IN BIOMETRICS-BASED AUTHENTICATION SYSTEM

(71) Applicant: Visa International Service Association, San Francisco, CA (US)

(72) Inventors: Yuhang Wu, Foster City, CA (US); Sunpreet Singh Arora, San Mateo, CA (US); Hao Yang, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 539 days.

(21) Appl. No.: 16/685,203

(22) Filed: Nov. 15, 2019

(65) Prior Publication Data

US 2021/0152549 A1    May 20, 2021

(51) Int. Cl.
| | | |
|---|---|---|
| *G06F 7/04* | (2006.01) | |
| *G06F 15/16* | (2006.01) | |
| *H04L 29/06* | (2006.01) | |
| *H04L 9/40* | (2022.01) | |
| *G06N 3/04* | (2006.01) | |
| *G06N 3/08* | (2006.01) | |

(52) U.S. Cl.
CPC .......... *H04L 63/0861* (2013.01); *G06N 3/04* (2013.01); *G06N 3/08* (2013.01)

(58) Field of Classification Search
CPC ......... H04L 63/0861; G06N 3/04; G06N 3/08
USPC .......................................................... 726/6
See application file for complete search history.

(56) References Cited

U.S. PATENT DOCUMENTS

| | | | |
|---|---|---|---|
| 10,402,827 B2 | 9/2019 | Sheets | |
| 2013/0174243 A1* | 7/2013 | Inatomi | H04L 9/3231 726/7 |
| 2018/0145833 A1 | 5/2018 | Lin | |
| 2019/0130110 A1* | 5/2019 | Lee | G06F 21/57 |

(Continued)

OTHER PUBLICATIONS

Jain et al., "An Introduction to Biometric Recognition" IEEE Transactions on Circuits and Systems for Video Technology, vol. 14, No. 1; Jan. 2004; 17 pages.

(Continued)

*Primary Examiner* — Brandon Hoffman
*Assistant Examiner* — Samuel Ambaye
(74) *Attorney, Agent, or Firm* — Schwabe, Williamson & Wyatt, PC

(57) ABSTRACT

A computer-implemented method for improving security of a biometrics-based authentication system comprises receiving, by one or more servers, enrolled biometric samples of an enrolled user during an enrollment stage of the biometrics-based authentication system. Augmented biometric samples are created by adding learned perturbations to the enrolled biometric samples of the enrolled user. During a request for authentication, submitted biometric samples are received from a second user. The submitted biometric samples of the second user are compared to the enrolled biometric samples and to the augmented biometric samples of the enrolled user based on predefined metrics. Based on the comparison it is determined whether the submitted biometric samples of the second user have been modified to impersonate the enrolled user.

14 Claims, 9 Drawing Sheets

(56) References Cited

U.S. PATENT DOCUMENTS

| | | |
|---|---|---|
| 2019/0188562 A1 | 6/2019 | Edwards |
| 2019/0220866 A1 | 7/2019 | Starr |
| 2020/0220870 A1* | 7/2020 | Wagner ................. H04L 9/3231 |
| 2020/0387589 A1* | 12/2020 | Gehrmann .............. G06F 21/32 |

OTHER PUBLICATIONS

Patent Cooperation Treaty: International Search Report and Written Opinion for PCT/US2020/057959 dated Jan. 25, 2021; 10 pages.

* cited by examiner

USING AN ENROLLED BIOMETRIC DATASET TO DETECT ADVERSARIAL EXAMPLES IN BIOMETRICS-BASED AUTHENTICATION SYSTEM

BACKGROUND

Biometric recognition or, simply, biometrics refers to the automatic recognition of users based on a set of recognizable and verifiable data, whether physiological or behavioral. A biometric system operates by acquiring biometric data from an individual, extracting a feature set from the acquired data, and comparing the feature set against a template set in a database. Prior to using the biometric system, a user must first go through an enrollment stage. During the enrollment stage, the biometric characteristic of a user is scanned by a biometric reader to produce a digital representation of the characteristic. In order to facilitate matching, the input digital representation is then processed by a feature extractor to generate a discriminatory features, called a template, which may be stored in a database.

Depending on the application context, a biometric system may operate either in an authentication/verification mode or in an identification mode. Authentication answers the question: "is the user who they say they are?" Authentication mode operates by comparing the captured biometric data to the user's own biometric template(s) in the database to determine resemblance. In more detail, a similarity module compares the features extracted during recognition against the stored templates to generate similarity scores. The similarity module may also make a decision as to whether the user's claimed identity is confirmed.

Identification mode is the process of determining the identity of a user. Identification modes answers the question "Who is the user?" In the identification mode, the system recognizes a user by searching the templates of all the users in the database for a match. In this case, the user is identified as one among a group of others, which is a one-to-many comparison. The identification mode also uses the similarity module to compare the features extracted during recognition against the stored templates to generate similarity scores.

Biometric systems have a limitation in that an imposter may attempt to spoof the biometric trait of an enrolled user. Typically, the feature extractor may be implemented using a deep neural network to produce machine learning models, and one method of spoofing employs adversarial machine learning to fool the machine learning models through malicious input. Recent research has shown a susceptibility of deep neural networks to adversarial examples. Adversarial examples are inputs that are specifically crafted with a malicious intent. For a biometric system trained to recognize persons in an image, adversarial examples could be generated with the goal of misclassifying an object belonging to one category to a different category, such as one person modifying his/her image to impersonate another. Examples of adversarial examples for a generic image classification system include a machine-tweaked image of a dog that looked like a cat both to computers and to humans, and perturbing the appearance of a stop sign so that an autonomous vehicle will classify the stop sign as a merge or speed limit sign instead.

Over the past few years, several different methods to generate adversarial examples for deep neural networks have been published. Techniques have been also developed to defend against adversarial examples crafted using some of these methods. Most of these defensive techniques, however, though can be broken easily given the knowledge of the defense method.

Accordingly, it would be desirable to provide an improved system and method for detecting adversarial examples.

BRIEF SUMMARY

Various embodiments provide methods and systems for improving security of a biometrics-based authentication system using an enrolled biometric dataset to detect adversarial examples. Aspects of the embodiments include receiving enrolled biometric samples of a user that is enrolled during the enrollment stage of the biometrics-based authentication system. Augmented biometric samples are created by adding perturbations to the enrolled biometric samples of the enrolled user. During a request for authentication, submitted biometric samples are received from a second user. The submitted biometric samples of the second user are compared to the enrolled biometric samples and to the augmented biometric samples of the enrolled user based on predefined metrics. Based on the comparison it is determined whether the submitted biometric samples of the second user have been modified to impersonate the enrolled user. In embodiment, the enrolled biometric samples are not accessible by attackers.

According to the method and system disclosed herein, the exemplary embodiments improve adversarial defense techniques of biometric authentication systems in that adding the perturbations to the enrolled biometric samples of the enrolled user increases the difficulty of an adversary creating adversarial biometric samples even in the case where the enrollment biometric samples are leaked to the adversary via an insider breach.

DETAILED DESCRIPTION

Figure 1:
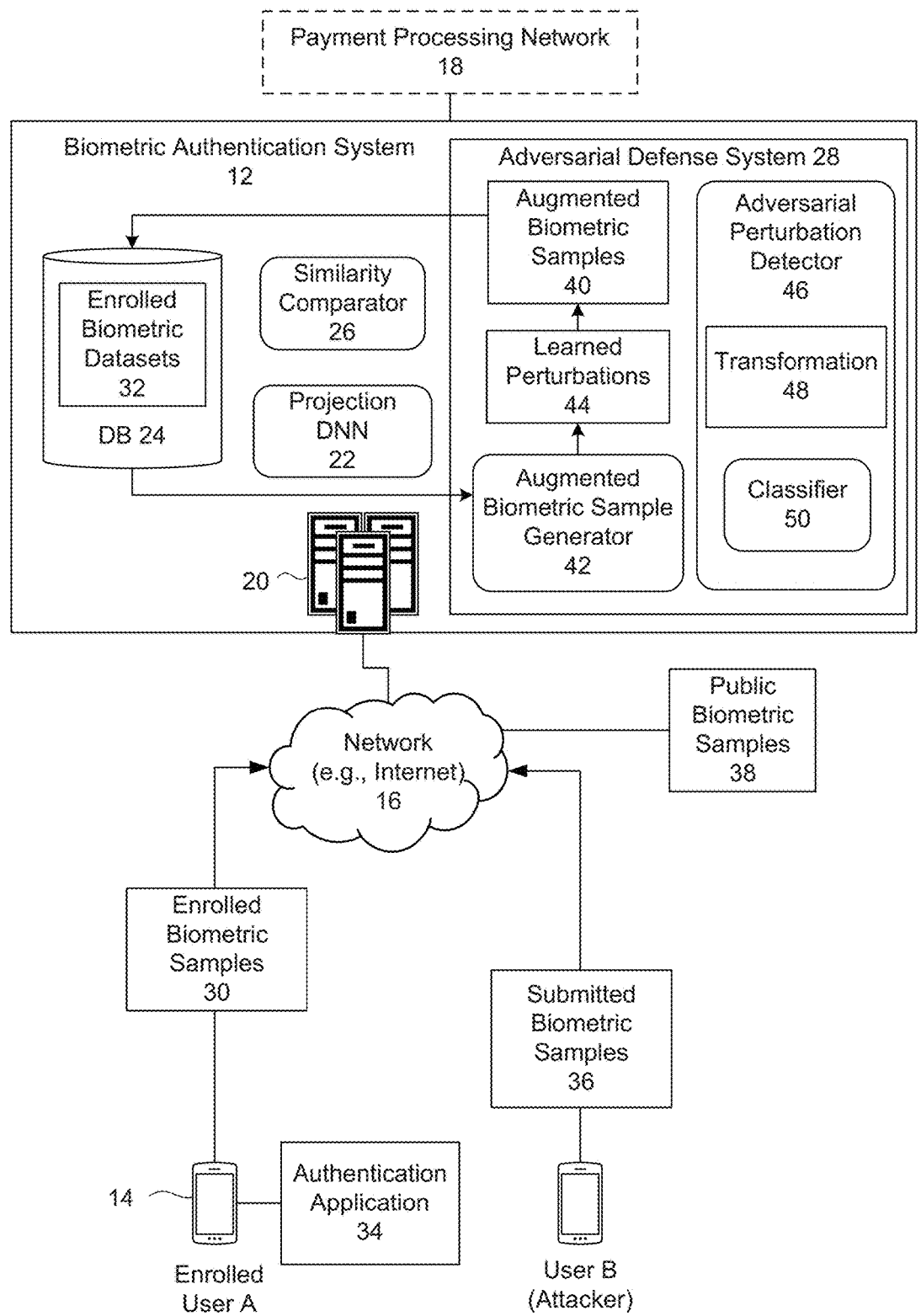
FIG. 1 is a diagram illustrating one embodiment of a system for using an enrolled biometric dataset to detect adversarial examples in a biometrics-based authentication system.

The exemplary embodiments relate to using an enrolled biometric dataset to detect adversarial examples in biometrics-based authentication system. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The disclosed embodiments relate to using an enrolled biometric dataset to detect adversarial examples in a biometrics-based authentication system. Applicants recognize that one way to design stronger defense mechanisms is to incorporate domain knowledge. According to the disclosed embodiments, domain knowledge is used in a biometric verification setting to design a strong defense mechanism from adversarial biometric samples. More specifically, security of a biometrics-based authentication system is improved by using enrolled biometric samples of a user to detect adversarial biometric samples crafted specifically to target the enrolled user's identity. It is assumed that the adversary crafting the adversarial biometric samples does not have access to the enrolled biometric samples. However, augmented biometric samples with perturbations (realistic or synthetic and designed by human or automatically generated by a machine learning algorithm) are added to the enrolled biometric samples with the aim of increasing the difficulty of crafting adversarial biometric samples if the enrolled biometric samples are accessed by an adversary due to, for example, an insider data breach. The enrolled biometric samples with the augmented enrolled biometric samples are compared with the adversarial biometric samples based on different pre-defined metrics. Based on the comparison, a decision is made whether the adversarial biometric samples have been modified to impersonate the enrolled user.

FIG. 1 is a diagram illustrating one embodiment of a system for using enrolled biometric dataset to detect adversarial examples in a biometrics-based authentication system. The system 10 includes a biometric authentication system 12 in communication with the user devices 14 over a network 16, such as the Internet. Components of the biometric authentication system 12 may include one or more processors or servers 20, a projection deep neural network (DNN) 22, an enrollment database 24, a similarity comparator 26 and an adversarial defense system 28.

In one embodiment, the biometric authentication system 12 may be the front end for another system, such as a payment processing network 18, to authenticate users for a transaction. The payment processing network 18 may refer to an entity that receives transaction authorization requests from merchants or other entities and provides guarantees of payment, in some cases through an agreement between the transaction service provider and an issuer institution. The payment processing network supports and delivers payment related services (e.g., authentication services, authorization services, exception file services, and clearing and settlement services, etc.). Examples of a payment processing network may include a payment network provided by Visa®, MasterCard®, American Express®, or any other entity that processes credit card transactions, debit card transactions, and other types of commercial transactions.

The biometric authentication system 12 acquires biometric samples of a first user (e.g., enrolled user A) during an enrollment stage. The enrollment stage may be performed through a software authentication application 34 provided by the biometric authentication system 12 that runs on either one of the servers 20 or a user device 14 (e.g., smartphone, PC, watch or tablet). During the enrollment process the authentication application 34 prompts the enrolled user to create enrolled biometric samples 30, which in one embodiment, are images of the user's face/head. In one embodiment, the images may be taken with the user device 14, and the authentication application 34 transmits the enrolled biometric samples 30 to the biometric authentication system 12 over the network 16, where they are received by one of the servers 20. The enrolled biometric samples 30 are processed by a projection DNN 22 into enrolled biometric dataset 32 and stored in the enrollment database 24, as explained further below.

Subsequently, the biometric authentication system 12 receives an authentication request from a second user (user B). The authentication request transmitted from the second user includes submitted biometric samples 36. The request can be made by the enrolled user or another user, e.g., user B, or user B may be an attacker. The submitted biometric samples 36 are processed by the projection DNN 22 into submitted biometric datasets (not shown) and the similarity comparator 26 compares the enrolled biometric datasets 32 of the enrolled user to the submitted biometric datasets. If there is a match within one or more thresholds, the user is authorized and gains access to the payment processing network 18. If not, authorization request of the second user is rejected.

Before describing the adversarial defense system 28 that enhances security of the biometric authentication system 12, the authentication process performed by the biometric authentication system 12 and attacks thereon are first explained.

Figure 2:
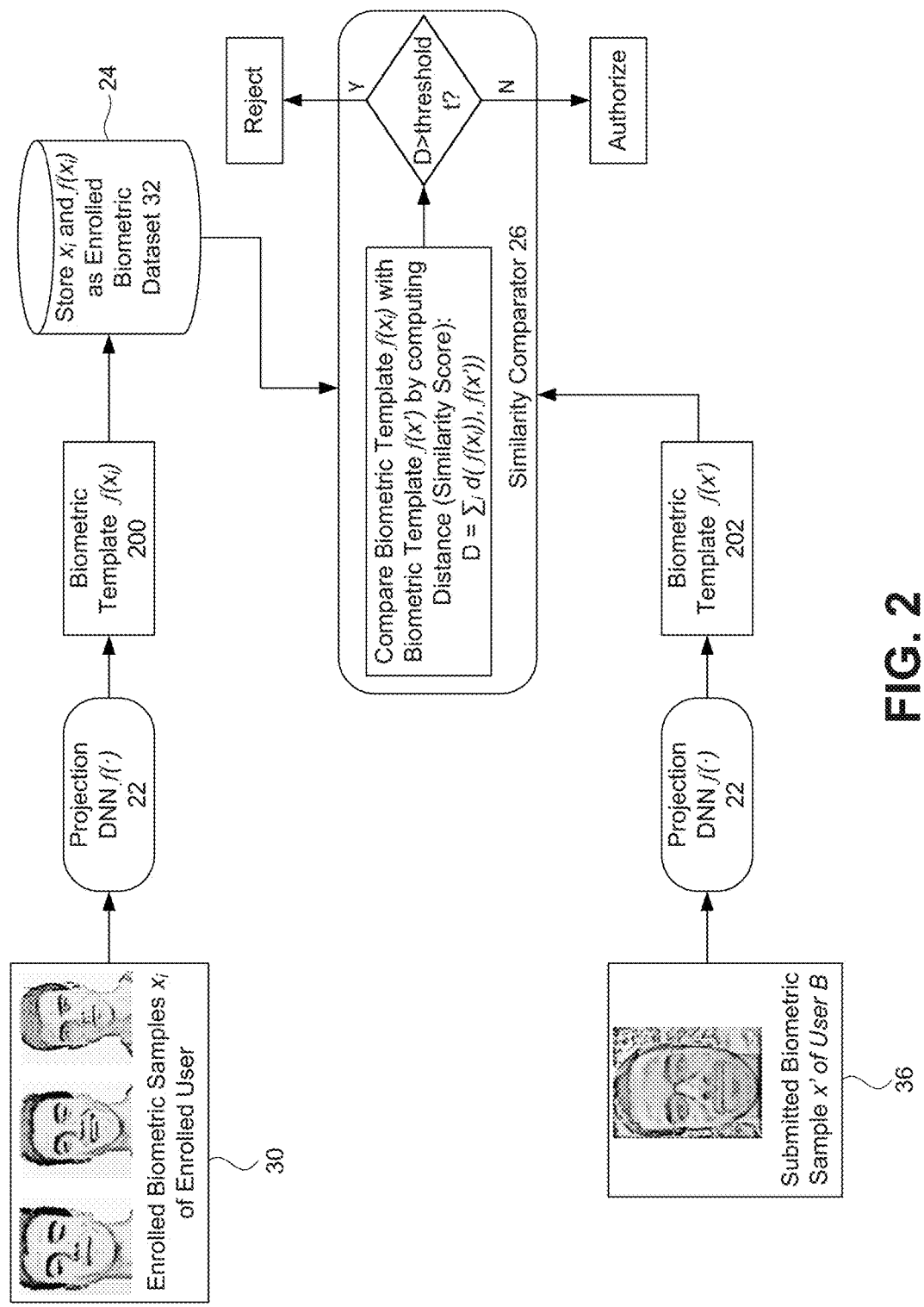
FIG. 2 is a diagram illustrating a generic authentication process performed by the biometric authentication system prior to activation of the adversarial defense system.

FIG. 2 is a diagram illustrating a generic authentication process performed by the biometric authentication system 12 prior to activation of the adversarial defense system 28, where like components from FIG. 1 have like reference numerals. Referring to both FIGS. 1 and 2, the biometric authentication system 12 receives the enrolled biometric samples 30, represented as $x_i$, of the enrolled user. The enrolled biometric samples $x_i$ may be one or many samples. The projection DNN 22 applies a mapping function f(•) to the enrolled biometric samples 30 to generate a biometric template $f(x_i)$ 200, which can be a one dimensional feature vector or a high dimensional tensor. One or more biometric templates may be generated. That is, each biometric sample may generate one template, or a single composite biometric template may be generated from different biometric samples. The enrolled biometric samples $x_i$ and the biometric template $f(x_i)$ 200 are stored as the enrolled biometric dataset 32 in the enrollment database 24.

Similarly, the biometric authentication system 12 receives the submitted biometric sample x' 36 (one or many) from the same or a second user. The projection DNN 22 applies the same mapping function f(•) to the submitted biometric samples 36 to generate a biometric template f(x') 202. The mapping function f(•) projects $x_i$ and x' to a common embedding subspace.

The similarity comparator 26 then compares the biometric template $f(x_i)$ 200 with the biometric template f(x') 202 in the embedding subspace. This is done by computing a distance between the biometric template 200 and biometric template 202. The distance may be represented as similarity score or distance score, such that D=$\Sigma_i$ d(f(x)), f(x')). If the similarity comparator 26 determines that the distance D is greater than a first threshold (t), the authorization request is rejected. Otherwise, the authentication request is authorized.

Referring again to FIG. 1, the enrolled user may further have public biometric samples 38 that are easier for an attacker to obtain than the enrolled biometric samples 30 that are stored on the user device 14 and/or in the enrollment database 24. For example, the enrolled user may have images stored on social media websites that are publically available to others to see. As explained below, the presence of public biometric samples 38 presents a security risk as an attacker can gain access to, and modify, the public biometric samples 38 to attack the biometric authentication system 12.

Figure 3:
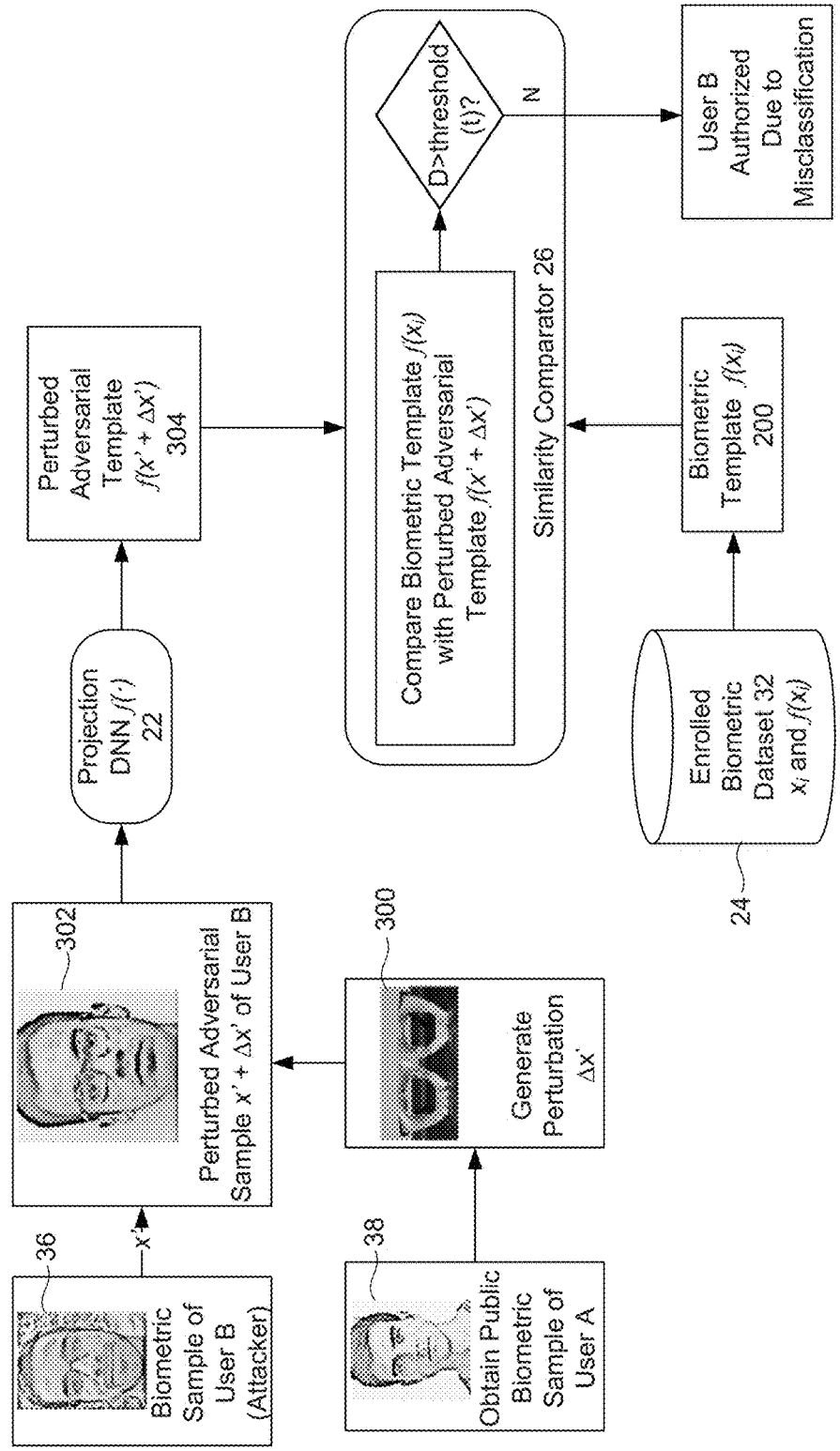
FIG. 3 is a diagram illustrating an impersonation attack performed on a generic biometric authentication system.

FIG. 3 is a diagram illustrating an impersonation attack performed on a generic biometric authentication system. FIG. 3 assumes an attacking second user targets the enrolled user for impersonation and that the biometric information of the attacking second user is represented by biometric sample x'. The second user first obtains the public biometric sample 38 of the enrolled user. The second user then computes a similarity between the biometric template 200 of the enrolled user and a biometric template of the attacker (not shown). Based on the similarity, the attacker uses the public biometric sample 38 to create a perturbation Δx' 300 that will be added to the attacker's biometric sample x' to generate a perturbed adversarial sample x'+Δx' 302. The perturbed adversarial sample x'+Δx' 302 of the attacker is designed to minimizes the distance between perturbed adversarial sample x'+Δx' 302 and the enrolled biometric samples $x_i$ of the targeted enrolled user. The perturbation Δx' 300 is computed based on standard attacking methods such as the Fast Gradient Signed Method (FGSM), projected gradient descent (PGD) attack, Carlini-Wagner (CW) loss function, and the like to minimize the distance: d((f(x'+Δx'), f(x)) or d((f(x'+Δx'), $f(x_i)$).

The perturbation Δx' 300 may be crafted based either on the public biometric samples 38 or the enrolled biometric samples 30 if obtainable (e.g. during a breach of the enrollment database 24 or the user device 14 of the enrolled user). Due to the transferability of adversarial perturbation, even though the perturbation Δx' is crafted based on the public biometric samples 38 of the enrolled user, the perturbation Δx' can be used to attack the enrolled biometric samples 30. The perturbation Δx' 300 may be physical or digital. In the example shown, the perturbation Δx' 300 comprises cardboard glasses that are worn by the second user when taking biometric sample images to generate the perturbed adversarial sample x'+Δx' 302.

After the perturbed adversarial sample x'+Δx' 302 is captured and submitted to the biometric authentication system, the projection DNN 22 applies the same mapping function f(•) to the perturbed adversarial sample x'+Δx' 302 to generate a perturbed adversarial template f(x'+Δx') 304. The similarity comparator 26 then compares the biometric template $f(x_i)$ 200 of the enrolled user with the perturbed adversarial template f(x'+Δx') 304 in the embedding subspace. However, in this case since the perturbed adversarial template f (x'+Δx') 304 is designed to be close in distance to the biometric template $f(x_i)$ 200, the similarity comparator 26 misclassifies and authorizes the attacking second user because the distance D or similarity score is less than the threshold t, i.e., $\Sigma_i$d(f($x_i$), f(x'+Δx'))<t. Thus, in this approach, the attacker uses a well-crafted perturbed adversarial biometric sample 302 to impersonate the enrolled user to attack the generic authentication system and generate a fraudulent transaction once authenticated.

Referring again to FIG. 1, according to the disclosed embodiments, the adversarial defense system 28 is added to the biometric authentication system 12 (e.g., facial image, voice, fingerprint, etc.) to improve the security of the biometric authentication system 12 by defending against the use of adversarial samples of an attacker. As described herein, the adversarial defense system 28 uses the enrolled biometric samples 30 from the enrolled user to detect any fraudulently submitted biometric samples 36. In one embodiment, the biometric samples may comprise a facial image, but may represent other types of biometric data such as voice, fingerprints, and the like.

In one embodiment, the adversarial defense system 28 may include an augmented biometric sample generator 42 that uses and modifies the enrolled biometric dataset 32 of the enrolled user to include: (i) the one or more enrolled biometric samples 30 of the enrolled user acquired during in the enrollment stage, which are difficult to obtain by the attacker, and (ii) augmented biometric samples 40 (can be both realistic or synthesized) created from the enrolled biometric samples 30 or the public biometric samples 38 that increase the difficulty of crafting perturbed adversarial samples 302 should the enrollment biometric dataset 32 be leaked due to an insider data breach. In one embodiment, the augmented biometric sample generator 42 adds learned perturbations 44 to the enrolled biometric samples 30 to generate the augmented biometric samples 40.

In one embodiment, the projection DNN 22, the similarity comparator 26, and the adversarial defense system 28 are implemented as software components. In another embodiment, the components could be implemented as a combination of hardware and software. Although the projection DNN 22, the similarity comparator 26, and the adversarial defense system 28 are shown as separate components, the functionality of each may be combined into a lesser or greater number of modules/components. In addition, although one or more servers 20 are described as running the projection DNN 22, the similarity comparator 26, and the adversarial defense system 28, such components may be run on any type of one more computers that have a non-transitory memory and processor.

Both the server 20 and the user devices 14 may include hardware components of typical computing devices (not shown), including a processor, input devices (e.g., keyboard, pointing device, microphone for voice commands, buttons, touchscreen, etc.), and output devices (e.g., a display device, speakers, and the like). The server 20 and user devices 14 may include computer-readable media, e.g., memory and storage devices (e.g., flash memory, hard drive, optical disk drive, magnetic disk drive, and the like) containing computer instructions that implement the functionality disclosed when executed by the processor. The server 20 and the user devices 14 may further include wired or wireless network communication interfaces for communication. It should be understood that the functions of the software components may be implemented using a different number of software components than that shown.

Figure 4:
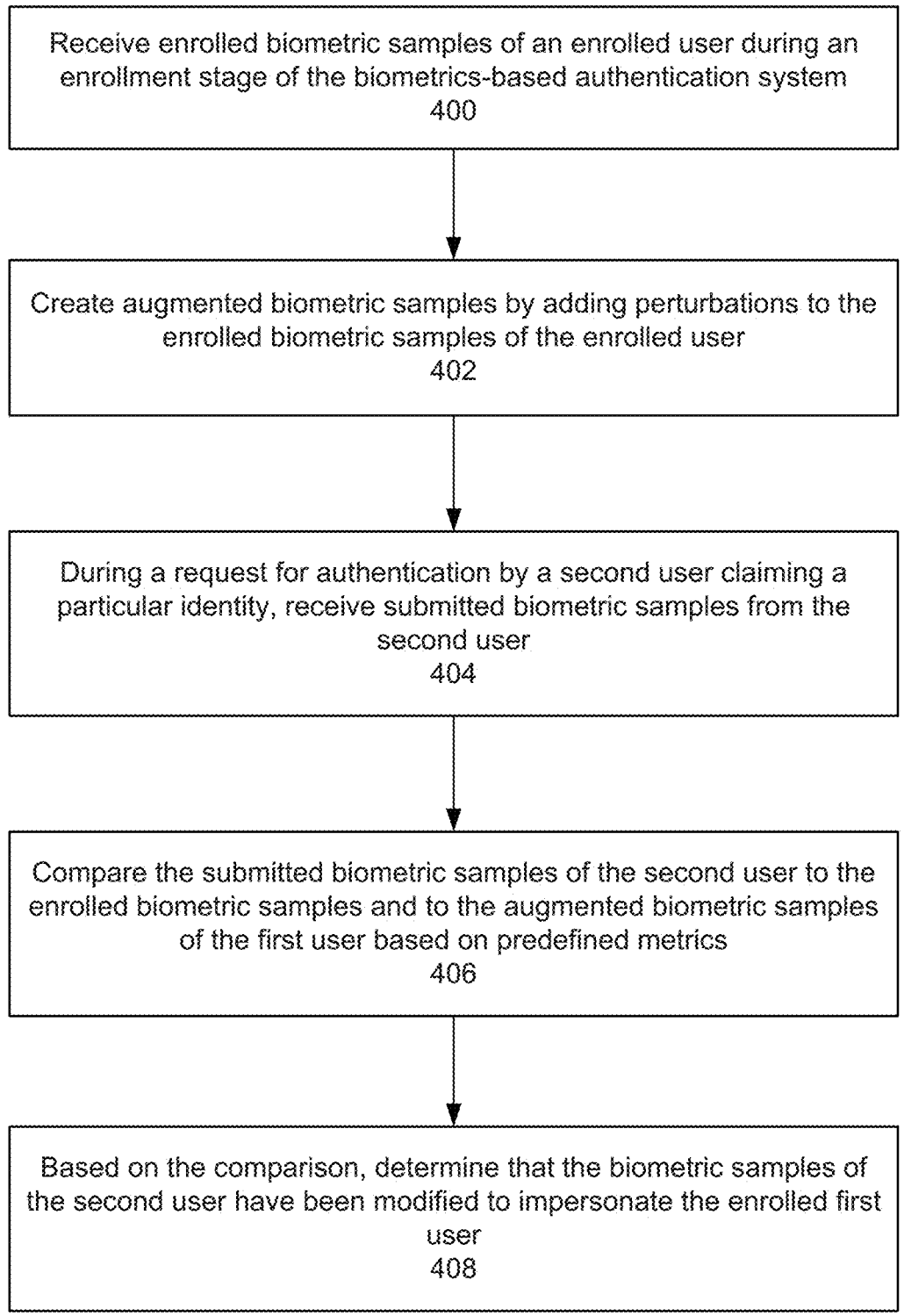
FIG. 4 is a flow diagram illustrating one embodiment of a process for improving security of a biometrics-based authentication system.

FIG. 4 is a flow diagram illustrating one embodiment of a process for improving security of a biometrics-based authentication system. The process may begin by one or more servers 20 obtaining the enrolled biometric samples 30 of an enrolled user during the enrollment stage of the biometrics-based authentication system (block 400). Augmented biometric samples 40 are created by adding perturbations to the enrolled biometric samples 30 of the enrolled user (block 402). In one embodiment the augmented biometric sample generator 42 may use a function g(•) to apply perturbations on the enrolled biometric samples to create augmented biometric samples 40, as described in FIG. 8B. In one embodiment, the augmented biometric sample generator 42 executing on one or more processors or servers generates and adds the learned perturbations 44 to the enrolled biometric samples 30 to create the augmented biometric samples 40.

Thereafter, during a request for authentication by a second user, the one or more servers 20 receive submitted biometric samples 36 from the second user (block 404).

In response, the submitted biometric samples 36 of the second user are compared to the enrolled biometric samples 30 and to the augmented biometric samples of the enrolled user based on predefined metrics (block 406). In one embodiment, 46 may be implemented by the similarity comparator 26 executing on the one or more processors or servers 20.

Based on the comparison, it is determined that the biometric samples of the second user have been modified with a perturbation 300 to impersonate the enrolled user (block 408). In one embodiment, block 408 may be implemented by the adversarial perturbation detector 28 executing on the one or more processors or servers 20. Referring again to FIG. 1, in one embodiment, the adversarial defense system 28 may further comprises an adversarial perturbation detector 46 to determine if the submitted biometric samples 36 of the second user have been modified with a perturbation using adversarial machine learning. In one embodiment, the adversarial perturbation detector 46 may include a transformation operation 48, such as a convolutional neural network (CNN), and a classifier 50 (e.g. a neural network), as described further below. In other embodiments, the process may proceed without creating the augmented biometric samples 40 (block 402) and without using the augmented biometric samples 40 in during the compare process (block 406) if necessary.

Figure 5:
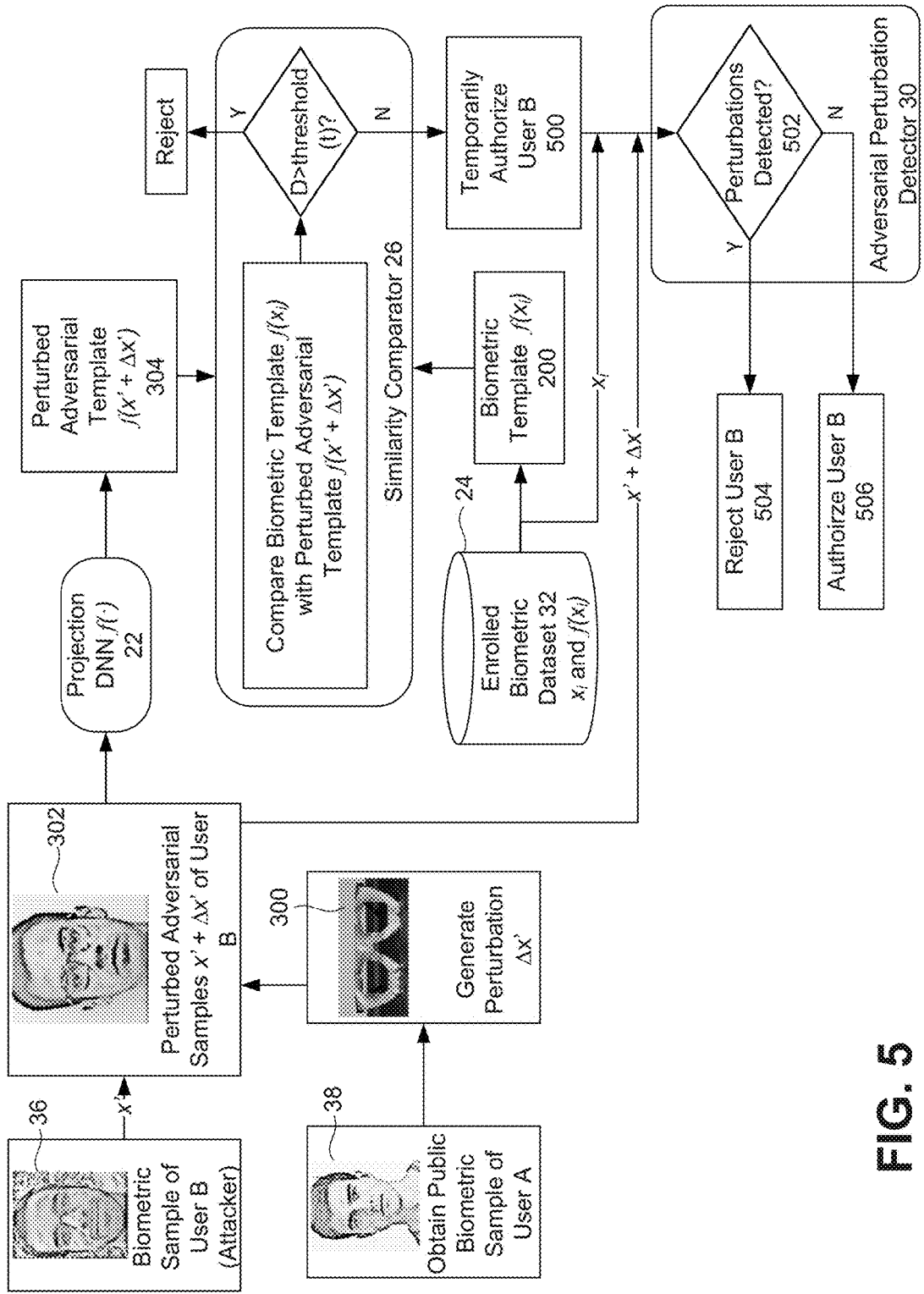
FIG. 5 is a diagram illustrating detection of an impersonation attack on the biometric authentication system by the adversarial defense system in further detail.

FIG. 5 is a diagram illustrating detection of an impersonation attack on the biometric authentication system by the adversarial defense system in further detail. The process begins similar to the process described in FIG. 3 in which the attacker (user B) obtains the public biometric sample 38 of the enrolled user; computes a similarity between the biometric template 200 of the enrolled user and a biometric template of the attacker (not shown); and based on the similarity, the public biometric sample 38 is used to create a perturbation $\Delta x'$ 300 that will be added to the attacker's biometric sample $x'$ to generate a perturbed adversarial sample $x'+\Delta x'$ 302. Detection of an impersonation attack involves detecting that the submitted biometric samples 36 of the second user comprises one or more perturbed adversarial samples $x'+\Delta x'$ 302.

First, the submitted biometric sample 36 comprising the perturbed adversarial sample $x'+\Delta x'$ 302 is received by the biometric authentication system 12, and the projection DNN 22 applies the mapping function f(•) to the perturbed adversarial sample $x'+\Delta x'$ 302 to generate the perturbed adversarial template $f(x'+\Delta x')$ 304. The similarity comparator 26 then compares the biometric template $f(x_i)$ 200 of the enrolled user from the enrollment database 24 with the perturbed adversarial template $f(x'+\Delta x')$ 304 in the embedding subspace by calculating the distance score as described in FIG. 2. However, in this case since the perturbed adversarial template $f(x'+\Delta x')$ 304 is designed to be close in distance to the biometric template $f(x_i)$ 200, the similarity comparator 26 authorizes the attacking second user.

According to one aspect of the disclosed embodiments, the adversarial perturbation detector 28 is activated only in response to the request for authentication by second user being temporarily authorized by the biometric authentication system 12 via the similarity comparator 26 (block 500). According to one aspect of the disclosed embodiments, the adversarial perturbation detector 28 uses the enrolled biometric samples 30 of the enrolled user, which are hidden/inaccessible by the second user, to detect whether adversarial samples were submitted by the second user. During a training stage, the adversarial perturbation detector 28 uses the enrolled biometric samples 30 at least in part to create the augmented biometric samples 40 by adding learned perturbations 44 to the enrolled biometric samples 30. The augmented biometric samples 40 are then added to the enrolled biometric samples 30.

In addition to the enrolled biometric sample $x_i$ 30, the adversarial perturbation detector 28 receives as input the submitted biometric samples 36 of the second user, which comprise perturbed adversarial samples $x'+\Delta x'$ 302, and determines if any perturbation are detected (block 502). Responsive to detecting any perturbations in the submitted biometric samples 36, the adversarial perturbation detector 28 rejects the authorization request of the second user (block 504). Otherwise the authorization request is granted and the second user is authorized.

Figure 6:
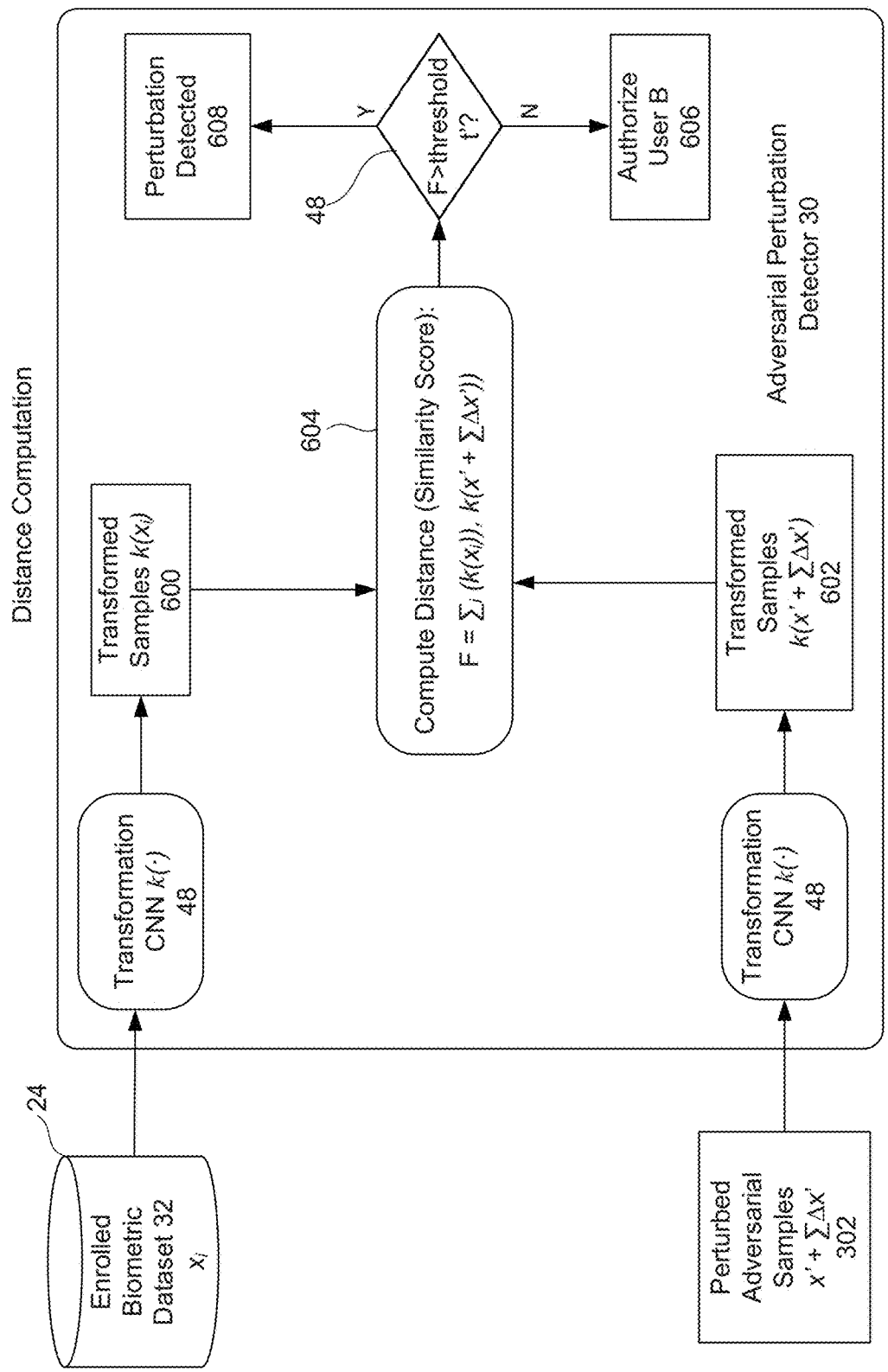
FIG. 6 is a diagram illustrating the process used by the adversarial perturbation detector to detect perturbations in the submitted biometric samples.

FIG. 6 is a diagram illustrating the process used by the adversarial perturbation detector 28 to detect whether the submitted biometric samples 36 have been modified with perturbations. In this embodiment, the submitted biometric samples 36 of the second user are adversarial in that they have been altered with perturbations and now comprise perturbed adversarial samples $f(x'+\Delta x')$ 282.

The process may begin by the adversarial perturbation detector 28 accessing the enrolled biometric dataset 32 from the enrollment database 24 to aid in detecting adversarial samples. The enrolled biometric dataset 32 includes images with the learned perturbations 44. Thus the enrolled biometric dataset 32 comprises samples/images, where $i \in \{1: N\}$. Similarly, the perturbed adversarial samples $x'+\Delta x'$ 302 may include multiple perturbations, shown as $\Sigma \Delta x'$, where is a summation.

According to a further aspect of the disclosed embodiments, the adversarial perturbation detector 28 further includes a transformation, has a learned transformation function k(•) configured to maximize the summation of distance $\Sigma_i \, d(k(x'+\Delta x')-k(x_i))$, $i \in \{1:M\}$. The adversarial perturbation detector 28 receives the enrolled biometric samples 30 comprising $x_i$ of the enrolled user and the perturbed adversarial samples $x'+\Sigma \Delta x'$ 302 of the second user for transformation into a transformed subspace. In one embodiment, this may be done by using transformation 48 to apply function k(•) to the enrolled biometric samples $x_i$ 30 and the perturbed adversarial samples $x'+\Sigma \Delta x'$ 302 to generate transformed enrolled samples $k(x_i)$ 600 and a transformed adversarial sample $k(x'+\Sigma \Delta x')$ 602, which are in the transformed subspace. In embodiments, the transformation function k(•) can be decomposed into multiple projections: $k = g_1 \circ g_2 \circ g_3 \ldots$, where $g_1$ can be layer in a convolutional neural network, $g_2$ can be another layer in the convolutional network, and $g_3$ can be a non-linear projection in a support vector machine (SVM).

The adversarial perturbation detector 28 then computes a distance (similarity score) between transformed enrolled samples $k(x_i)$ 600 and the transformed adversarial sample $k(x'+\Sigma\Delta x')$ 602 in the transformed subspace (block 604). In one embodiment the distance F can be computed as: $F = \Sigma_i d(k(x_i), k(x'+\Delta x'))$. In one embodiment, F can be a distance metric that is mathematically computed, but F may also be a learnt distance metric/classifier. The classifier 50 determines that the transformed adversarial sample $k(x'+\Sigma\Delta x')$ 602, and therefore the submitted biometric sample 36 of the second user, is adversarial when the computed distance F is greater than a second threshold t', indicating that one or more perturbations have been detected in the perturbed adversarial biometric sample 302 (block 608). Otherwise, the second user is authorized (block 606).

Figure 7:
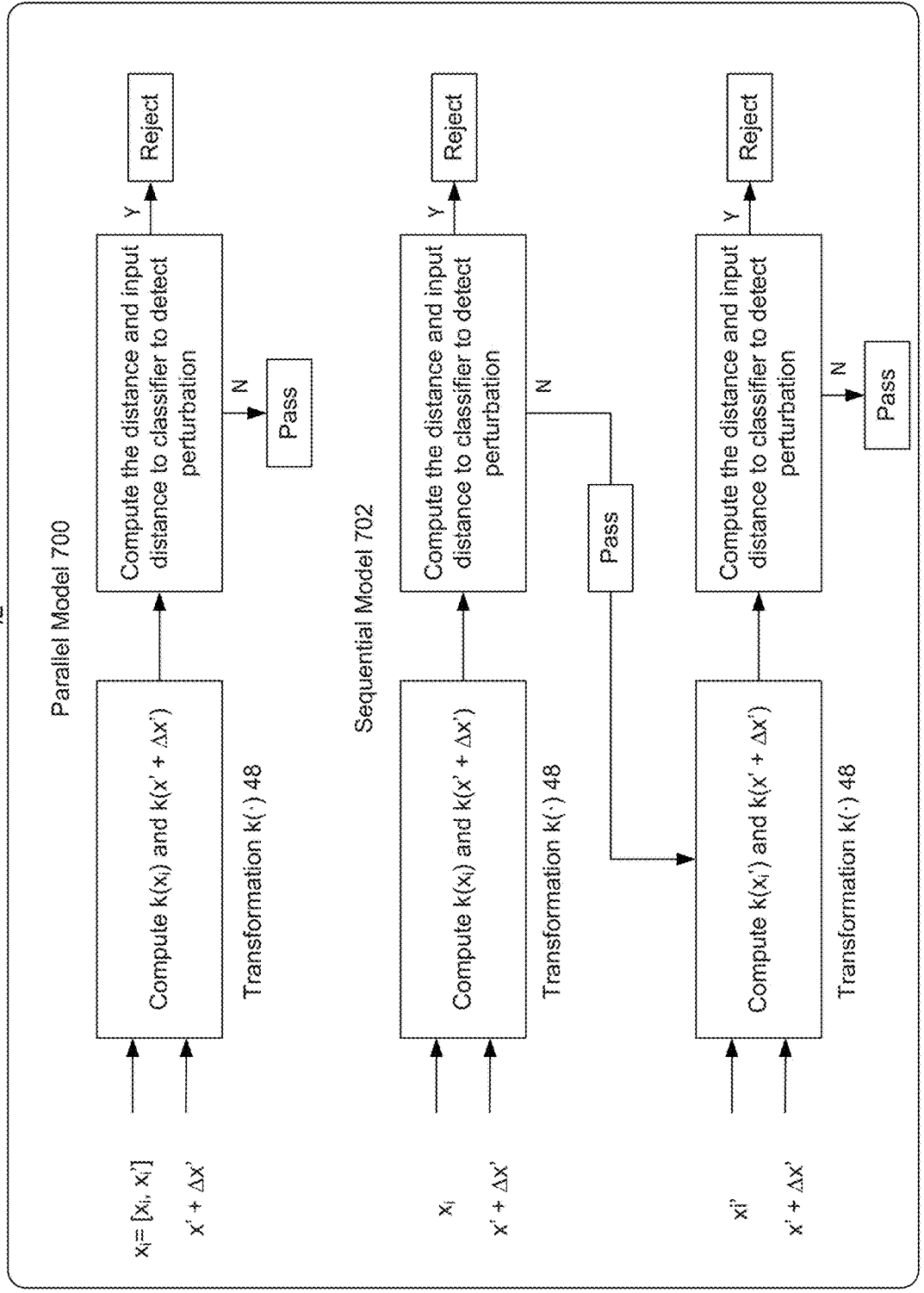
FIG. 7 is a diagram illustrating embodiments performed by the adversarial perturbation detector to detect adversarial submitted biometric samples.

FIG. 7 is a diagram illustrating embodiments performed by the adversarial perturbation detector 28 to detect adversarial submitted biometric samples when the enrolled biometric dataset $x_i$ 32 includes augmented biometric samples $x_i'$ such that the enrolled biometric samples $x_i=[x_i, x_i']$.

In one embodiment, the adversarial perturbation detector 28 may be deployed using a parallel model 700 (also shown in FIG. 5) in which the $x_i$ and $x_i'$ of the enrolled biometric samples 30 are input to the transformation 48 k(•) in parallel along with the perturbed adversarial samples $x'+\Delta x'$ 302 of the second user to compute transformed enrolled samples $k(x_i)$ and transformed adversarial sample $k(x'+\Delta x')$. The adversarial perturbation detector 28 then computes the distance score and inputs the distance score to the classifier 50 to make a final decision of whether a perturbation as detected.

In another embodiment, the adversarial perturbation detector 28 may be deployed using a sequential model 702 in which the $x_i$ and learned perturbations $x_i'$ of the enrolled biometric samples 30 are input sequentially to the transformation 48. In the sequential model 702, $x_i$ is inputted to the transformation 48 with the perturbed adversarial samples $x'+\Delta x'$ 302 to compute transformed enrolled samples $k(x_i)$ and transformed adversarial sample $k(x'+\Delta x')$. The adversarial perturbation detector 28 then computes the distance score and uses the classifier 50 to determine whether a perturbation as detected. If no perturbation is detected, then the learned perturbations $x_i'$ of the enrolled biometric samples 30 is input to the transformation 48 with the perturbed adversarial samples $x'+\Delta x'$ 302 to compute transformed enrolled samples $k(x_i')$ and transformed adversarial sample $k(x'+\Delta x')$. The adversarial perturbation detector 28 then computes the distance score and uses the classifier 50 to make a final decision of whether a perturbation as detected.

Figure 8A:
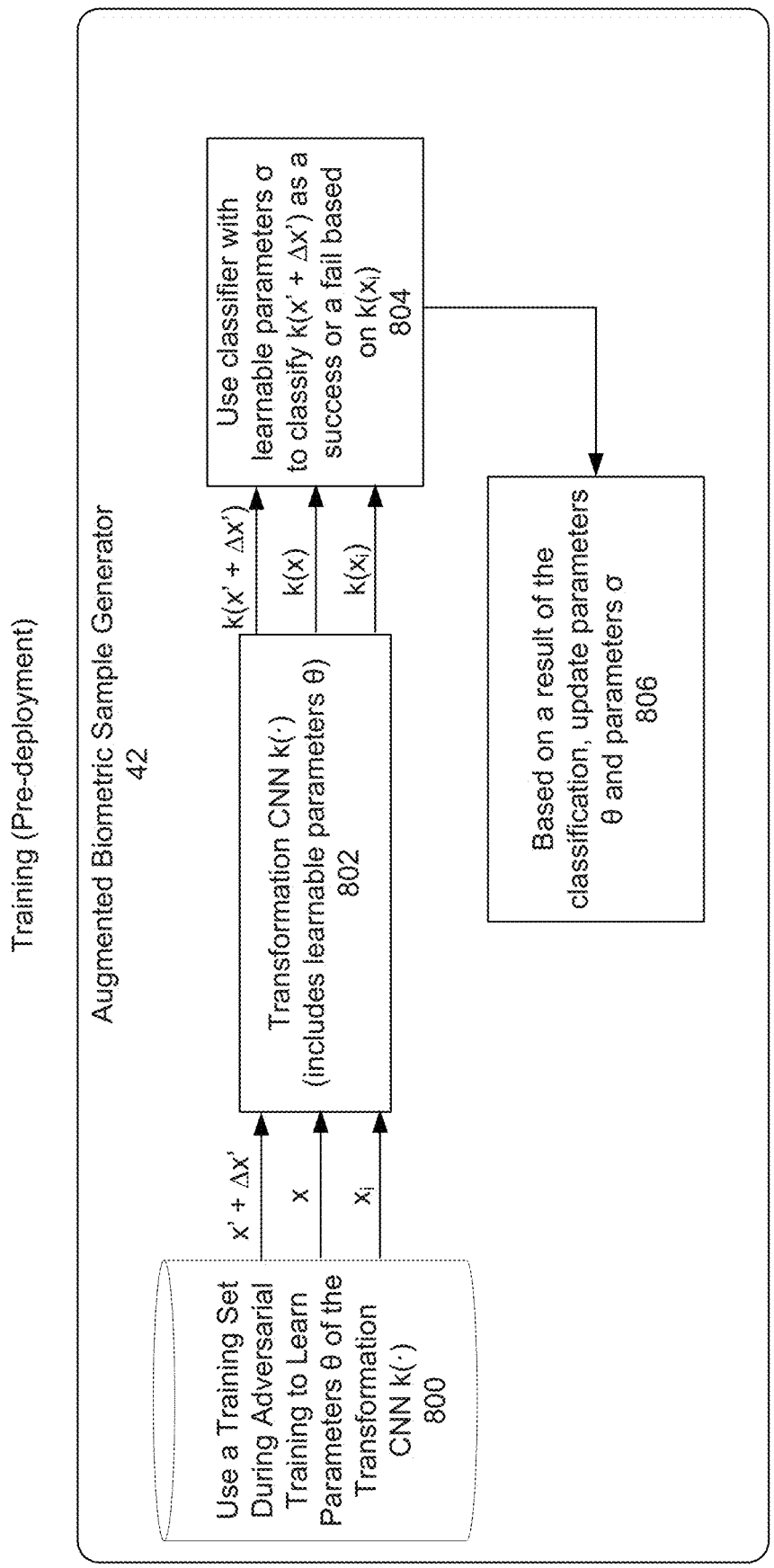
FIG. 8A is a diagram illustrating a process for training the adversarial perturbation detector prior to deployment.

FIG. 8A is a diagram illustrating a process for training the adversarial perturbation detector 28 prior to deployment. The training process uses the transformation 48 k(•) having learnable parameters θ and a classifier F having learnable parameters σ, and uses a training set to learn the parameters θ and σ (block 800). In one embodiment, the training set includes the enrolled biometric samples $x_i$ of the enrolled user, the public biometric samples x of the enrolled user, and perturbed adversarial samples $x'+\Delta x'$ of the second user.

The process learns the parameters for the transformation 48 k(•) and classifier 50 by inputting the training set to the transformation 48 k(•) (block 802). The process generates transformed enrolled samples $k(x_i)$, transformed publicly available sample $k(x)$, and a transformed adversarial sample $k(x'+\Delta x')$. In embodiments, the transformation function k(•) can be decomposed into multiple projections: $k = g1 \circ g2 \circ g3 \ldots$, where g1 can be a layer in a convolutional neural network, g2 can be another layer in the convolutional network, and g3 can be a non-linear projection in a support vector machine (SVM).

Next the classifier 50 with learnable parameters σ is used to classify the transformed adversarial sample $k(x'+\Delta x')$ as a success (e.g., a "1") or a fail (e.g., a "0") based on the transformed enrolled samples $k(x_i)$ (block 804). In embodiments, the classifier may be the same or different than classifier 50. The classifier may be a deep neural network or a threshold-based classifier: $\Sigma_i d(k(x_i), k(x'+\Sigma\Delta x')) <$ third threshold t", it depends on the output of k( ) In either case, the classifier needs to contain an aggregation function (e.g., ED to merge the results of $x_i$. Based on a result of the classification, the learnable parameters θ and a are updated and process may repeat as necessary.

Another operation of the training process is to create the augmented biometric samples 40 by adding learned perturbations 44 to the enrolled biometric samples 30 of the enrolled user as described in block 402 of FIG. 4.

Figure 8B:
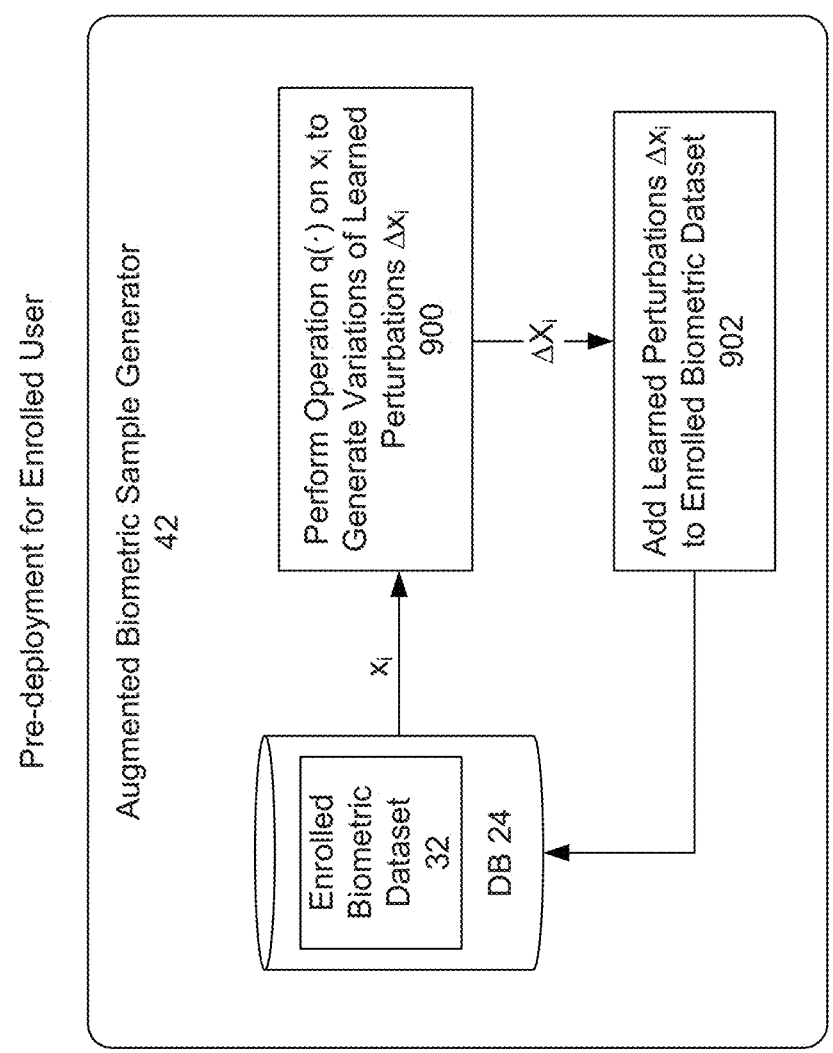
FIG. 8B is a diagram illustrating an overview of the process of creating augmented biometric samples of the enrolled user (block 402 of FIG. 4).

FIG. 8B is a diagram illustrating an overview of the process of creating augmented biometric samples 40 of the enrolled user (block 402 of FIG. 4). In one embodiment, the process of creating the augmented biometric samples 40 is performed after enrollment of each new user, but before the adversarial perturbation detector 28 is deployed to authenticate the new enrolled user.

The process may include by retrieving the enrolled biometric data set $x_i$ 32 for the enrolled user from the enrollment database 24 and performing an operation q(•) on $x_i$ to generate variations of the learned perturbations $\Delta x_i$ (block 900). Operations in q(•) may increase the intra-class distances between $x_i$, such as by generating random noise on the enrollment images. In an alternative embodiment, an image may be selected from the public biometric samples x 38, and generate adversarial images based on $x_i$ to slightly increase the distance: $d(k(x), k(x_i+\Delta x_i))$ to obtain $\Delta x_i$. The learned perturbations $\Delta x_i$ are then added to the enrolled biometric data set 902 for the enrolled user (block 902).

According the disclosed embodiments, adding the learned perturbations $\Delta x_i$ that are added to $x_i$ may increase the difficulty of creating adversarial biometric samples even in the case where the enrollment set is leaked to an adversary during an insider breach so that:

$$\sum_i d(k(\Delta x' + x') - k(x_i + \Delta x_i)) > \sum_i (k(\Delta x' + x') - k(x_i)).$$

A method and system for using an enrollment set to detect adversarial examples in biometrics-based authentication system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A computer-implemented method for improving security of a biometrics-based authentication system, comprising:
   receiving, by one or more servers, enrolled biometric samples $x_i$ of an enrolled user during an enrollment stage of the biometrics-based authentication system;
   applying a function $f(\cdot)$ to the enrolled biometric samples $x_i$ to generate a biometric template $f(x_i)$;
   creating, by the one or more servers, augmented biometric samples by adding perturbations to the enrolled biometric samples of the enrolled user;
   receiving, by the one or more servers, during a request for authentication, submitted biometric samples x' from a second user;
   applying the function $f(\cdot)$ to the submitted biometric samples x' to generate a biometric template f(x');
   comparing, by the one or more servers, the submitted biometric samples of the second user to the enrolled biometric samples and to the augmented biometric samples of the enrolled user based on predefined metrics by:
      computing a distance between the biometric template $f(x_i)$ of the enrolled user with the biometric template f(x'), and
      responsive to determining that the distance is less than a first threshold, temporarily authorizing the request for authentication; and
   based on the comparison, determining, by the one or more servers, that the submitted biometric samples of the second user have been modified to impersonate the enrolled user.

2. The method of claim 1, further comprising: storing the enrolled biometric samples $x_i$, the biometric template $f(x_i)$ and the augmented biometric samples as an enrolled biometric dataset.

3. The method of claim 1, wherein determining that the submitted biometric samples of the second user have been modified is activated only in response to the request for authentication being temporarily authorized.

4. The method of claim 3, further comprising:
   responsive to the request for authentication being temporarily authorized, receiving, by an adversarial perturbation detector, the enrolled biometric samples $x_i$ of the enrolled user and the submitted biometric samples of the second user, where the submitted biometric samples comprise perturbed adversarial samples x'+Δx'; and
   responsive to detecting any perturbations, rejecting the request for authentication of the second user, and otherwise, granting the request for authentication and authorizing the second user.

5. The method of claim 4, wherein determining that any perturbations are detected further comprises:
   applying a transformation function $k(\cdot)$ to both the enrolled biometric samples $x_i$ and the perturbed adversarial samples x'+Δx' to generate transformed enrolled samples $k(x_i)$ and transformed adversarial sample k(x'+Δx'), which are in a transformed subspace;
   computing a distance F between the transformed enrolled samples $k(x_i)$ and the transformed adversarial sample k(x'+Δx') in the transformed subspace; and
   determining the transformed adversarial sample k(x'+ΣΔx') is adversarial when the distance F is greater than a second threshold t' indicating that one or more perturbations have been detected.

6. The method of claim 5, wherein the enrolled biometric samples xi include augmented biometric samples xi' such that the enrolled biometric samples xi=[xi, xi'], and wherein the $x_i$ and $x_i'$ of the enrolled biometric samples are input to the transformation function $k(\cdot)$ using one of a parallel model and a sequential model.

7. The method of claim 5, further comprising training an adversarial perturbation detector prior to deployment by:
   performing the training using a transformation CNN $k(\cdot)$ having learnable parameters θ and a classifier having learnable parameters σ, and using a training set to learn the parameters θ and σ, wherein the training set comprises the enrolled biometric sample $x_i$, the public biometric sample x of the enrolled user, and the perturbed adversarial template x'+Δx' of the second user;
   inputting the training set to the transformation function $k(\cdot)$ to generate the transformed enrolled samples $k(x_i)$, a transformed publicly available sample k(x), and the transformed adversarial sample k(x'+Δx');
   classifying, by a classifier with learnable parameters σ, the transformed adversarial sample k(x'+Δx') as a success or as a fail based on the transformed enrolled samples $k(x_i)$; and
   based on a result of the classification, updating the learnable parameters θ and σ.

8. A non-transitory computer readable medium having stored thereon software instructions that, when executed by a processor, cause the processor to improve security of a biometrics-based authentication system, the instructions comprising:
   receiving, by one or more servers, enrolled biometric samples $x_i$ of an enrolled user during an enrollment stage of the biometrics-based authentication system;
   applying a function $f(\cdot)$ to the enrolled biometric samples $x_i$ to generate a biometric template $f(x_i)$;
   creating, by the one or more servers, augmented biometric samples by adding learned perturbations to the enrolled biometric samples of the enrolled user;
   receiving, by the one or more servers, during a request for authentication, submitted biometric samples x' from a second user;
   applying the function $f(\cdot)$ to the submitted biometric samples x' to generate a biometric template f(x');
   comparing, by the one or more servers, the submitted biometric samples of the second user to the enrolled biometric samples and to the augmented biometric samples of the enrolled user based on predefined metrics by
      computing a distance between the biometric template $f(x_i)$ of the enrolled user with the biometric template f(x'), and
      responsive to determining that the distance is less than a first threshold, temporarily authorizing the request for authentication; and
   based on the comparison, determining, by the one or more servers, that the submitted biometric samples of the second user have been modified to impersonate the enrolled user.

9. The non-transitory computer readable medium of claim 8, further comprising: storing the enrolled biometric samples $x_i$, the biometric template $f(x_i)$ and the augmented biometric samples as an enrolled biometric dataset.

10. The non-transitory computer readable medium of claim 8, wherein determining that the submitted biometric samples of the second user have been modified is activated only in response to the request for authentication being temporarily authorized.

11. The non-transitory computer readable medium of claim 10, further comprising:
  responsive to the request for authentication being temporarily authorized, receiving, by an adversarial perturbation detector, the enrolled biometric samples $x_i$ of the enrolled user and the submitted biometric samples of the second user, where the submitted biometric samples comprise perturbed adversarial samples $x'+\Delta x'$; and
  responsive to detecting any perturbations, rejecting the request for authentication of the second user, and otherwise, granting the request for authentication and authorizing the second user.

12. The non-transitory computer readable medium of claim 11, wherein determining that any perturbations are detected further comprises:
  applying a transformation function $k(\bullet)$ to both the enrolled biometric samples $x_i$ and the perturbed adversarial samples $x'+\Delta x'$ to generate transformed enrolled samples $k(x_i)$ and a transformed adversarial sample $k(x'+\Delta x')$, which are in a transformed subspace;
  computing a distance F between the transformed enrolled samples $k(x_i)$ and the transformed adversarial sample $k(x'+\Delta x')$ in the transformed subspace; and
  determining the transformed adversarial sample $k(x'+\Sigma \Delta x')$ is adversarial when the distance F is greater than a second threshold $t'$ indicating that one or more perturbations have been detected.

13. The non-transitory computer readable medium of claim 12, further comprising training an adversarial perturbation detector prior to deployment by:
  performing the training using a transformation $k(\bullet)$ having learnable parameters $\theta$ and a classifier having learnable parameters $\sigma$, and using a training set to learn the parameters $\theta$ and $\sigma$, wherein the training set comprises the enrolled biometric sample $x_i$, the public biometric sample x of the enrolled user, and the perturbed adversarial template $x'+\Delta x'$ of the second user;
  inputting the training set to the transformation function $k(\bullet)$ to generate the transformed enrolled samples $k(x_i)$, a transformed publicly available sample $k(x)$, and the transformed adversarial sample $k(x'+\Delta x')$;
  classifying, by a classifier with learnable parameters $\sigma$, the transformed adversarial sample $k(x'+\Delta x')$ as a success as a fail based on the transformed samples $k(x_i)$; and
  based on a result of the classification, updating the learnable parameters $\theta$ and $\sigma$.

14. A system, comprising:
  a memory;
  a processor coupled to the memory; and
  a software component executed by the processor that is configured to:
    receive enrolled biometric samples $x_i$ of an enrolled user during an enrollment stage of the biometrics-based authentication system;
    apply a function $f(\bullet)$ to the enrolled biometric samples $x_i$ to generate a biometric template $f(x_i)$;
    create augmented biometric samples by adding learned perturbations to the enrolled biometric samples of the enrolled user;
    receive during a request for authentication, submitted biometric samples x' from a second user;
    apply the function $f(\bullet)$ to the submitted biometric samples x' to generate a biometric template $f(x')$;
    compare the submitted biometric samples of the second user to the enrolled biometric samples and to the augmented biometric samples of the enrolled user based on predefined metrics by:
      computing a distance between the biometric template $f(x_i)$ of the enrolled user with the biometric template $f(x')$, and
      responsive to determining that the distance is less than a first threshold, temporarily authorizing the request for authentication; and
    based on the comparison, determine that the submitted biometric samples of the second user have been modified to impersonate the enrolled user.

* * * * *